US006286128B1

(12) United States Patent
Pileggi et al.

(10) Patent No.: US 6,286,128 B1
(45) Date of Patent: Sep. 4, 2001

(54) METHOD FOR DESIGN OPTIMIZATION USING LOGICAL AND PHYSICAL INFORMATION

(75) Inventors: Lawrence Pileggi, Pittsburgh, PA (US); Majid Sarrafzadeh, Wilmette, IL (US); Sharad Malik, Princeton, NJ (US); Abhijeet Chakraborty, Sunnyvale, CA (US); Archie Li, Mountain View, CA (US); Robert Eugene Shortt; Christopher Dunn, both of Sunnyvale, CA (US); David Gluss, Woodside, CA (US); Dennis Yamamoto, Los Altos, CA (US); Dinesh Gaitonde, Sunnyvale, CA (US); Douglas B. Boyle; Emre Tuncer, both of Palo Alto, CA (US); Eric McCaughrin, Oakland, CA (US); Feroze Peshotan Taraporevala, San Jose, CA (US); Gary K. Yeap, San Jose, CA (US); James S. Koford, San Jose, CA (US); Joseph T. Rahmeh, Austin, TX (US); Lilly Shieh, Union City, CA (US); Salil R. Raje, Santa Clara, CA (US); Sam Jung Kim, San Jose, CA (US); Satamurthy Pullela, Cupertino, CA (US); Yau-Tsun Steven Li, Causeway Bay (HK); Tong Gao, Fremont, CA (US)

(73) Assignee: Monterey Design Systems, Inc., Sunnyvale, CA (US)

( * ) Notice: Subject to any disclaimer, the term of this patent is extended or adjusted under 35 U.S.C. 154(b) by 0 days.

(21) Appl. No.: 09/097,299

(22) Filed: Jun. 12, 1998

Related U.S. Application Data

(63) Continuation-in-part of application No. 09/021,973, filed on Feb. 11, 1998, now Pat. No. 6,099,580.

(51) Int. Cl.[7] .................................................. G06F 17/50

(52) U.S. Cl. ................................. 716/18; 716/10; 716/13; 716/2

(58) Field of Search .......................... 395/500.02–500.19; 716/1–21

(56) References Cited

U.S. PATENT DOCUMENTS 5,418,728 * 5/1995 Yada ...................................... 700/97
5,493,507 * 2/1996 Shinde et al. .......................... 703/14

(List continued on next page.)

OTHER PUBLICATIONS

Togawa et al. ("Maple–opt: a simultaneous technology mapping, placement, and global routing algorithm for FPGAs with performance optimization", proceedings of the ASP-DAC '95/CHDL '95/VLSI '95, IFIP international Conference on Hardware Description Languag, Aug. 1995.*

(List continued on next page.)

Primary Examiner—Matthew Smith
Assistant Examiner—Phallaka Kik
(74) Attorney, Agent, or Firm—Skjerven Morrill MacPherson; Edward C. Kwok

(57) ABSTRACT

A method for design optimization using logical and physical information is provided. In one embodiment, a method for design optimization using logical and physical information, includes receiving a behavioral description of an integrated circuit or a portion of an integrated circuit, optimizing placement of circuit elements in accordance with a first cost function, and optimizing logic of the circuit elements in accordance with a second cost function, in which the optimizing placement of the circuit elements and the optimizing logic of the circuit elements are performed concurrently. The method can further include optimizing routing in accordance with a third cost function, in which the optimizing routing, the optimizing placement of the circuit elements, and the optimizing logic of the circuit elements are performed concurrently.

10 Claims, 2 Drawing Sheets

U.S. PATENT DOCUMENTS

| | | | | |
|---|---|---|---|---|
| 5,526,517 | * | 6/1996 | Jones et al. | 707/8 |
| 5,657,243 | * | 8/1997 | Toyonaga et al. | 716/8 |
| 5,696,693 | * | 12/1997 | Aubel et al. | 716/8 |
| 5,787,268 | * | 7/1998 | Sugiyama et al. | 716/11 |
| 5,914,887 | * | 6/1999 | Scepanovic et al. | 716/8 |
| 6,099,580 | * | 8/2000 | Boyle et al. | 716/7 |
| 6,145,117 | * | 11/2000 | Eng | 716/18 |

OTHER PUBLICATIONS

Pedram et al. ("Layout driven logic restructuring/decomposition", Digest of Technical Papers, 1991 IEEE International Conference on Computer–Aided Design, Nov. 11, 1991, pp. 134–137).*

* cited by examiner

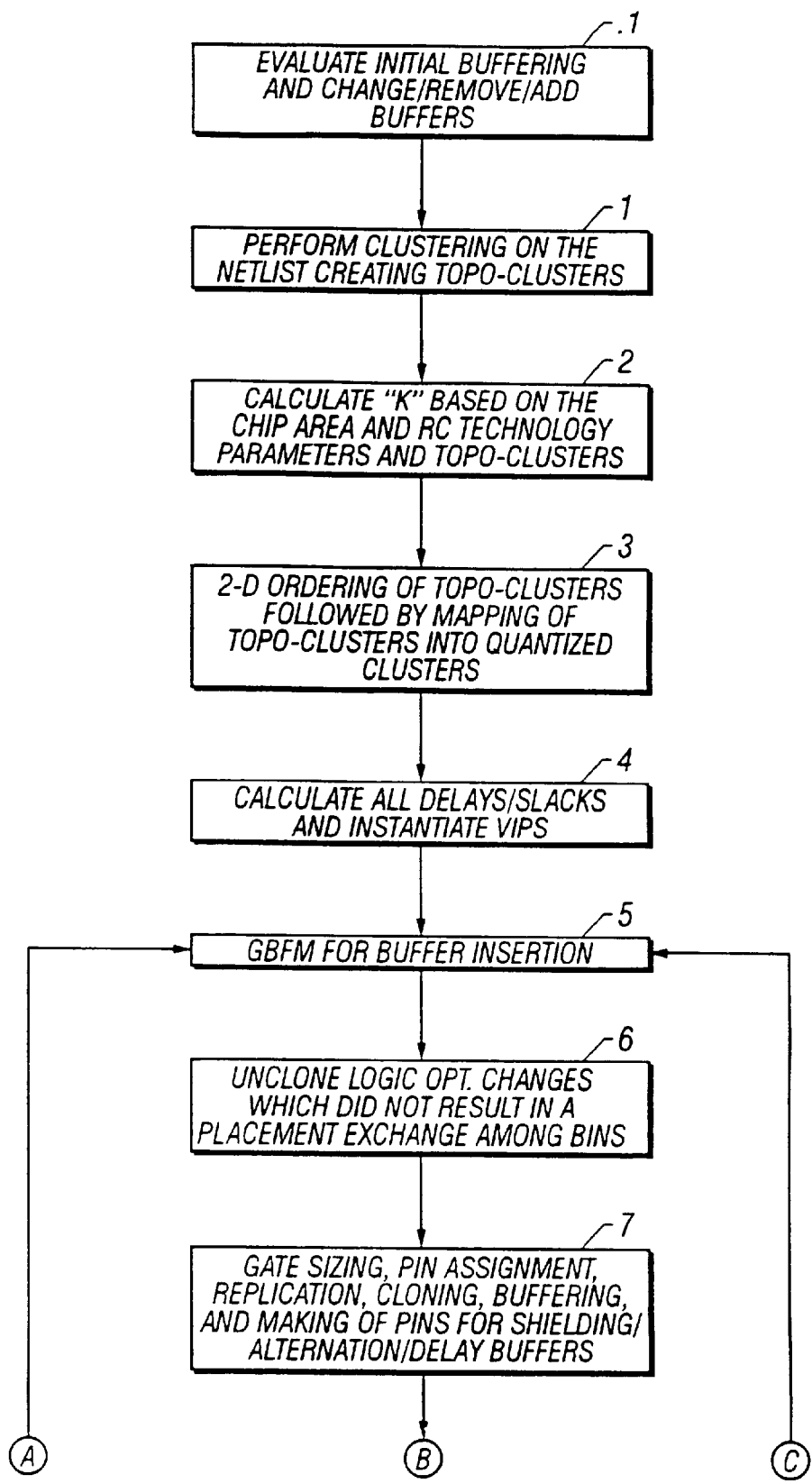
Fig. 1-A

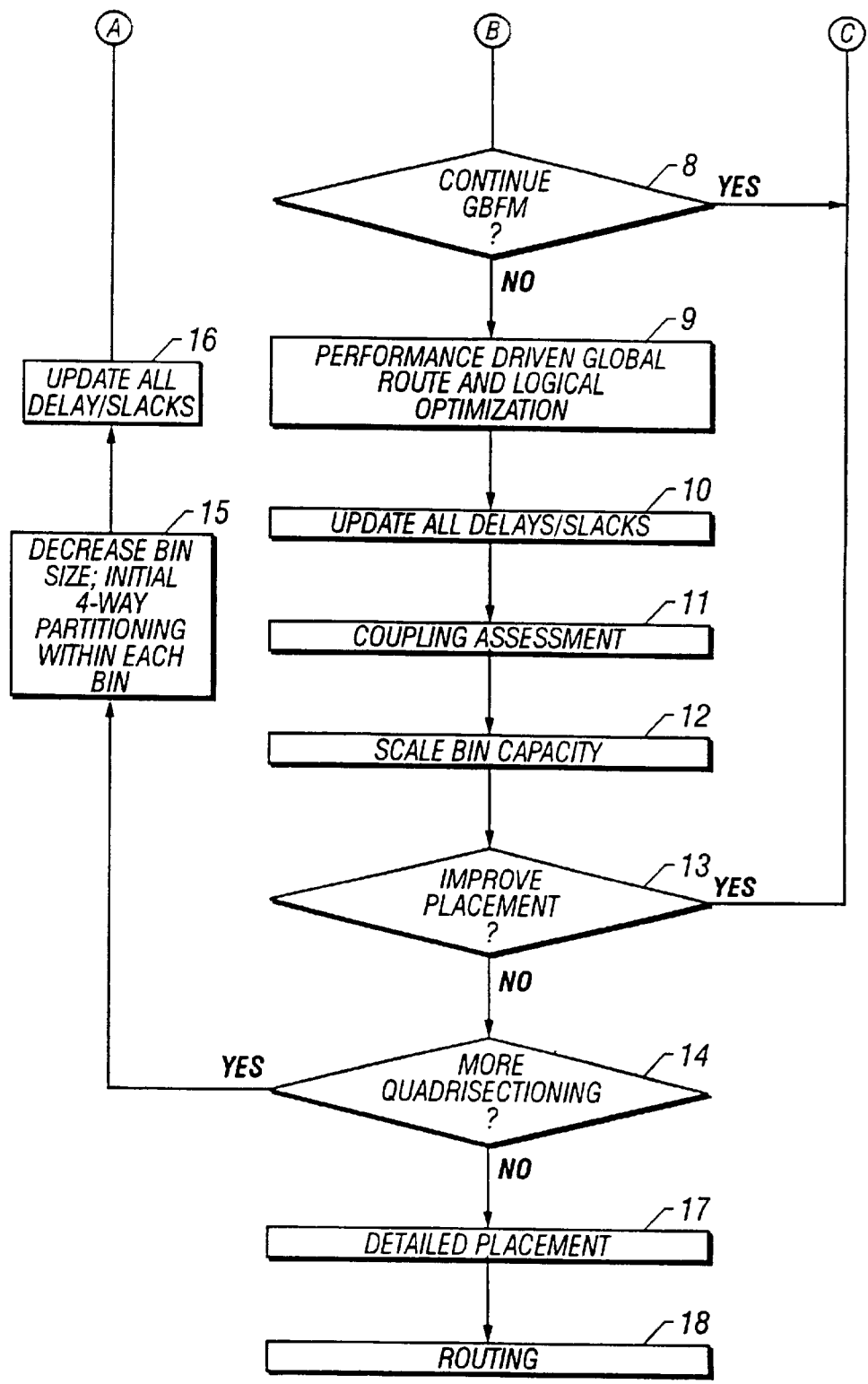
Fig. 1-B

METHOD FOR DESIGN OPTIMIZATION USING LOGICAL AND PHYSICAL INFORMATION

CROSS-REFERENCE TO RELATED APPLICATIONS

The present application is a continuation-part application of U.S. patent application Ser. No. 09/021,973, filed Feb. 11, 1998, entitled "Method for Providing Performance-Driven Logic Optimization in a Integrated Circuit Layout Design," to Douglas B. Boyle et al., now U.S. Pat. No. 6,099,580, issued on Aug. 8, 2000, and assigned to Montery Design Systems, Inc., which is also the Assignee of the present application.

BACKGROUND OF THE INVENTION

1. Field of the Invention

The present invention relates to integrated circuit design tools. In particular, the present invention relates to integrated circuit design tools hat optimize area performance and signal integrity in integrated circuits.

2. Discussion of the Related Art

The interconnection wiring ("interconnect") among circuit elements in an integrated circuit is expected to dominate signal delays and to limit achievable circuit density of an integrated circuit. Existing design methods, which treat interconnect as "parasitics" and focus on optimizing transistors and logic gates, are ill-equipped to provide a design that delivers the necessary performance. Typically, in a conventional design method, the circuit elements of an integrated circuit are first synthesized and placed. A global routing tool is then used to interconnect these circuit elements. Due to the interconnect dominance, accurate estimation of performance is available only after global routing. Because placement and routing are performed relatively independently, even though some tools take into consideration the connectivity among circuit elements in providing the placement, the global routing tool's ability to address power, timing, and congestion issues is severely limited.

Various techniques have been applied to address signal propagation performance in an integrated circuit design. For example, U.S. Pat. No. 5,638,291, entitled "Method and Apparatus for Making Integrated Circuits by Inserting Buffers into a Netlist to Control Clock Skew" to Li et al., discloses modification of a net list to insert buffers into clock signal paths to control clock skew. As another example, U.S. Pat. No. 5,396,435, entitled "Automated Circuit Design System and Method for Reducing Critical Path Delay Times" to Ginetti, discloses modification to a logic circuit to reduce delays in a critical path of an integrated circuit. However, the effectiveness of these methods for increasing circuit performance is constrained by their inability to concurrently affect placement of circuit elements.

Concurrent placement and wiring routing is disclosed in U.S. Pat. No. 4,593,363, entitled "Simultaneous Placement and Wiring for VLSI Chips" to Burstein et al. The '363 patent discloses an iterative method in which a global router is invoked to route networks redistributed under a hierarchical placement algorithm.

SUMMARY OF THE INVENTION

The present invention provides a method for integrated circuit design that optimizes integrated circuit performance and signal integrity. In particular, a method for design optimization using logical and physical information is provided. In one embodiment, a method for design optimization using logical and physical information, includes receiving a behavioral description of an integrated circuit or a portion of an integrated circuit, optimizing placement of circuit elements in accordance with a first cost function, and optimizing logic of the circuit elements in accordance with a second cost function, in which the optimizing placement of the circuit elements and the optimizing logic of the circuit elements are performed concurrently. The method can further include optimizing routing in accordance with a third cost function, in which the optimizing routing, the optimizing placement of the circuit elements, and the optimizing logic of the circuit elements are performed concurrently.

In one embodiment, the method further includes executing an inner loop (e.g., a geometrically bounded placement algorithm), the inner loop including the optimizing placement of the circuit elements, a reversal of optimizing logic changes that did not result in a change in the placement of the circuit elements, and the optimizing logic of the circuit elements; and executing an outer loop, the outer loop including executing a performance driven global router. The method can also include executing a final placement of the circuit elements, and executing a global router to perform a final routing.

The present invention is applicable not only to conventional design with conventional interconnect, but also in design, such as those with copper interconnect or design interconnected by RF transmission lines carrying high speed mixed mode signals. The present invention is also applicable to integrated systems design, such as the design of a micromachine including electronic circuits.

The present invention is better understood upon consideration of the detailed description below and the accompanying drawings.

BRIEF DESCRIPTION OF THE DRAWINGS

FIG. 1A is a flow diagram of a method for optimizing integrated circuit performance in accordance with one embodiment of the present invention. As shown in FIG. 1A, at step .1, an input net list (e.g., a logic gate-level net list synthesized from a behavioral description of an integrated circuit or a portion of an integrated circuit) (or a soft macro specification) is received. The input net list can include buffers and repeaters that were added during synthesis in an attempt to optimize performance. At step .1, the buffers and repeaters that were added during synthesis can be changed or removed, or buffers can be deleted (e.g., for attenuation purposes).

FIG. 1B is another embodiment of a flow diagram of a method for optimizing integrated circuit performance in accordance with one embodiment of the present invention. As shown in FIG. 1A.

DETAILED DESCRIPTION OF THE PREFERRED EMBODIMENTS

The present invention provides a method for design optimization using logical and physical information. In one embodiment, a method for design optimization using logical and physical information eliminates, or at least tightens as much as possible, the manual iteration loops between synthesis, placement, and timing/power analysis, and provides a complete methodology for interconnect-centric IC design. A large part of this methodology can be implemented using parallel computing. In particular, global aspects of the design are optimized so that the detailed routing problem is feasible. The logic optimization and placement are performed such that interconnect with a predictable delay is concurrently placed with the logic circuitry. The placed interconnect congestion is then optimized to ensure design feasibility. A cost function is a combination of timing and physical design area. It is expected that physical design area will be primarily constrained by interconnect congestion. This embodiment, therefore, concurrently optimizes logic and physical information so that there are no congestion or timing "hot spots" when the logic circuitry and predictable-interconnect are properly placed. Visualizing a contour plot of a chip surface, this will optimize toward a uniform contour for both (smeared) interconnect congestion and timing slacks to minimize peaks or valleys. Peaks being an obvious problem, whereas valleys indicate wasted resources.

The present invention can be applied to an integrated circuit design system, such as that disclosed in copending U.S. patent application, entitled "Performance Driven Design Optimization Using Logical and Physical Information" by D. Boyle et al., Ser. No. 09/021,973, filed Feb. 11, 1998, and assigned to Monterey Design Systems, Inc., which is also the Assignee of the present application. The disclosure of the Copending Application is hereby incorporated by reference in its entirety.

FIG. 1 is a flow diagram of a method for optimizing integrated circuit performance in accordance with one embodiment of the present invention. As shown in FIG. 1, at step .1, an input net list (e.g., a logic gate-level net list synthesized from a behavioral description of an integrated circuit or a portion of an integrated circuit) (or a soft macro specification) is received. The input net list can include buffers and repeaters that were added during synthesis in an attempt to optimize performance. At step .1, the buffers and repeaters that were added during synthesis can be changed or removed, or buffers can be deleted (e.g., for attenuation purposes).

At step 1, the circuit elements within the net list are clustered according to connectivity into "topological clusters" or "topo-clusters." The input information includes top-down timing constraints for paths or the required operating frequency. In this embodiment, within a topo-cluster, circuit elements are highly connected. By comparison, circuit elements of different topo-clusters are loosely connected. In forming topo-clusters, certain clock nets and certain circuit elements can be preplaced and labeled special to prevent the clustering algorithm to be applied to these special clock nets and circuit elements.

If pad assignments have not been made, then the topo-clusterings consider pads as objects, and the subsequent placement steps place them. If pad assignments have been made, then it is possible that they have been assigned in a way that will adversely impact the subsequent optimizations. Therefore, the topo-clustering algorithm should provide some diagnostics for bad pad assignments.

At step 2, a value "k" is calculated to divide the chip area of the integrated circuit into "bins" (or "quanto-clusters", for "quantized clusters") of predetermined areas. The value k is calculated based on the total available chip area and the expected RC delay characteristics of the interconnect technology. Typically, the RC delay characteristics depend on the resistance and the capacitance of the interconnect and the frequency of operation. The value "k" is a function of the minimum distance for which the propagation delay of a buffer is less than the RC delay of an interconnect wire of minimum width, and the maximum distance for which RC signal attenuation is acceptable.

The present invention also inserts a buffer (e.g., an inverter pair) or repeater when insertion of such a buffer (a) provides both additional drive to reduce the propagation delay to a far away load, and shielding to reduce the delay to a nearby load; or (b) reduces the delay to a nearby load on a critical path. The inserted buffer shields the nearby load from the capacitive load of the interconnect to a far away load. Buffer insertion based on these criteria can be performed while delay or slack graphs are calculated (e.g., at each of steps 4, 10 and 16, discussed below).

With the partition size established based on these conservative length estimates, a large percentage of inter-bin wires will include at least one inverter pair, and the eventual increase in gate area due to inverter-pair insertion can be estimated. Because lower bound estimate on lengths is used, not all of the inter-bin wires will include inverter pairs. The interbin wire pins are marked (at step 7, which is discussed below), and wavecalc (at step 5, which is discussed below) considers buffer insertion for all such nets. For subsequent optimization steps, this lower bound distance indicates that below this bin-to-bin center spacing, no wires between adjacent bins will require a repeater for attenuation purposes or a buffer for delay improvement purposes.

Because shielding of near driver fanouts generally improves with buffer insertion, determining when to insert shielding buffers requires global slack information. However, it may be wise to initially insert inverter pairs for shielding also, to allow the design to spread out. Therefore, at this initial level of partitioning, step 7 identifies and marks pins where a shielding buffer may be warranted at step 5. When marked as a shielding buffer, wavecalc will not have sufficient information to judge whether or not the shielding buffer is an improvement, so wavecalc inserts buffers for these specially marked pins if the interconnect capacitance calculations indicate that the near driver fanouts are improved. Because some of the gates will become closer together during subsequent levels of partitioning, a significant percentage of the interbin connections at a high level of partitioning can decrease to shorter wiring lengths during subsequent stages of partitioning. Because some of these inverter pairs will be removed during these subsequent stages, it is desirable for these inverter pairs to remain virtual inverter pairs (VIPs) for as long as possible, as discussed below.

With the value "k" calculated at step 2, the chip area can be divided into a 2m-dimensional configuration of k bins or quanto-clusters. At step 3, each topo-cluster obtained at step 1 is mapped into one or more quanto-clusters. The circuit elements of a quanto-cluster are mapped into a single center point within the quanto-cluster. In one embodiment, for each topo-cluster, circuit elements of the topo-cluster are assigned to a quanto-cluster until the quanto-cluster reaches its maximum gate capacity and the remaining unassigned circuit elements of the topo-cluster are then assigned to the next available adjacent quanto-cluster. This procedure repeats until all circuit elements of all topo-clusters are assigned.

The topo-clusters are mapped to the partition grid via a thorough optimization approach, such as annealing. An initial 2D ordering of "what's next to what" is used to seed the annealing. Topo-clusters that are larger than a k-partition are further partitioned as part of the mapping process. It is assumed that some error will be incurred in this mapping. However, it is expected that the subsequent k-level GBFM (at step 5, which is discussed below) which follows will address the global aspects of the clustering. Once an initial placement is available, the top-layer clk tree/mesh design is instantiated. With user input, a clk tree/mesh style is selected. The topo-clustering placement is then used to estimate local bin capacitances for latches in order to insert buffers and size the clock tree wiring.

In addition, in this embodiment, where a connection exists between two circuits elements mapped into two different quanto-clusters, a "virtual buffer" is inserted between the circuit elements. Because the circuit elements could eventually be placed within a distance of each other over which buffering is not necessary, at this stage of processing, the virtual buffer is not actualized by a modification to the input net list. Rather, the virtual buffer is kept on a "virtual list" until evaluation at a later step (step 9, which is described below) indicates that the virtual buffer should be actualized and included into the net list. However, for timing purpose, each virtual buffer is treated as if it is actually included into the net list. In this embodiment, a virtual buffer can be implemented by a pair of series-connected inverters, referred to as a virtual inverter pair or "VIP".

At step 4, having mapped all circuit elements into quanto-clusters, delays for each net are calculated. Because circuit elements within a quanto-cluster are placed at the center point, a statistical estimate of delay is provided for each net within a quanto-cluster. Such a statistical estimate of delay can be provided, for example, based on the fan-out at a driver of the net. A delay based on an estimate of the resistance and capacitance in a net ("RC calculations") can be provided for a net between circuit elements of different quanto-clusters. If a net has a non-negligible portion of delay within a quanto-cluster and a non-negligible portion of delay between clusters, then an estimate based on both the statistical estimate of delay and the RC calculations can be provided. In this embodiment, the expected performance at each net is represented by a "slack graph" (i.e., the slack at each net is represented by the time difference between the arrival time and the required time of a signal on the net).

Slack allocation schemes for performance-driven placement (see, e.g., W. Luk, A Fast Physical Constraint Generator for Timing Driven Layout, Proc. of the Design Automation Conference, June 1991) can become trapped in local minima, therefore the capabilities of a fully incremental timing analysis are provided. But it is recognized that updating the slack graphs at each placement iteration can be overly costly and could limit the use of parallel processing strategies. Therefore, a scheme is provided for lazy updates of the slack graph. Specifically, all delay changes among combinational sections are monitored, and once they exceed a threshold the slack graph are incrementally updated, as discussed below.

Inequality timing constraints, across blocks of combinational logic can be input. It is assumed that relative clocking speeds and clock phase widths have been established at the synthesis level and are passed as constraints to the timing level. In one embodiment, the timing in terms of adjusting the clock signals is not optimized.

The propagation delay of any logic gate can be estimated by conventional techniques, such as using Thevenin equivalent or effective load ($C_{eff}$) models. However, the $C_{eff}$ calculation can be approximate and use only one $C_{eff}$ iteration. For sizing, the gate models are also be characterized as a function of gate width.

Approximating the gate and interconnect delay to each fanout pin on a net during placement optimization involves an interconnect (net topology) model. A possible choice for this model would be a Steiner tree approximation, however, for efficiency the use of various spanning tree models and even comb tree models can be employed.

For nets that are non-critical, the optimal topology model is unnecessary, and a simple bounding box model is used to estimate congestion while a delay primitive model is used to estimate delays.

Because net criticality is unknown initially, all nets are assumed to be non-critical initially, and the simple net primitive model is used to calculate the delays. This model produces a pessimistic delay approximation, so that path lengths are not grossly underestimated in this step. Using these delay estimates, the nets with negative or small positive slacks are identified, and during the course of subsequent GBFM and LO (Logic Optimization) calls to wavecalc, the optimal topology model is used to estimate the delays and congestions for these identified nets.

The net topology approximation can also consider multiple wire width assignments for segments as a type of approximate layer assignment. Congestion of the inter-bin connections at the higher levels of partitioning reflects congestion of the upper layers of metal (which are thicker and wider).

Another case to consider is that when the gate delay is insensitive to net topology (e.g., a local net where C-load is dominated by pin-load capacitances, and metal resistance is negligible) even if the net is critical, the delay is estimated using a bounding box estimation of the metal capacitance.

The gate delays can be classified into three categories, and three models. For nets for which the gate delay is insensitive to net topology, the net can be treated as an equipotential surface, metal resistance is not, considered, and the load capacitance is estimated by the pin and half-perimeter capacitance. When the metal resistance is a factor and the net is critical, the gate and interconnect delays are calculated in terms of the first four moments from the optimal net topology using an implementation of the PRIMO/h-Gamma algorithms, which are discussed in R. Kay and L. Pileggi, PRIMO: Probability Interpretation of Moments for Delay Calculation, Proc. of the Design Automation Conference, June 1998 and T. Lin, E. Acar and L. Pileggi, h-gamma: An RC Delay Metric Based on a Gamma Distribution Approximation of the Homogeneous Response, Submitted to the International Conference on Computer-aided Design, April 1998. Finally, when the metal resistance matters, but the net is not critical, the delay is estimated using a net primitive model.

The moments of the optimal net topology or the primitive net model is calculated using an implementation of RICE (see, e.g., C. Ratzlaff, L. Pileggi, RICE: Rapid Interconnect Circuit Evaluator, IEEE Trans. on Computer-Aided Design, June 1994). The waveform calculator is capable of modeling detailed electrical effects such as current densities (for electromigration constraints) in terms of explicit expressions which are functions of the circuit parameters.

Statistical, or fanout based delay estimates are required, because all gates within a bin are considered to be in one, zero area, location. This fanout based statistical delay model should be based on technology and design history to improve the accuracy. Fanout based delay models are known to be inaccurate. However, because inverter pairs to the far away fanouts are added, the statistical delay models should be much more accurate than for the general case, because the net lengths are bounded by the size of the partitions. Moreover, as the partition sizes are decreased, the statistical model accuracy should increase. A combination of fanout model and interbin interconnect connection and loading can also be used (e.g., a hybrid mode). The estimated capacitance for the intra-bin statistical model appears as a load capacitance on the inter-bin net model.

With k-bin partitioning, where k is based on the minimum distance for which a signal traveling from the center of one partition to the center of another would most likely warrant the insertion of an inverter pair, most interbin wires are assumed to be connected via at least one VIP for gate counting purposes at this highest level of partitioning. However, VIPs are instantiated during the inner loop (steps 5 through 7), as discussed below.

In wavecalc, VIPs are inserted for those pins that are marked at step 7, which indicate where such insertion may be warranted. When a pin is marked, wavecalc in GBFM calculates the waveforms assuming that these inverters exist. Based on this analysis, the inverters are potentially inserted virtually. However, the net list is not changed. The inverter pairs that are inserted at this initial level of partitioning remain virtual throughout the inner loop, and the net list is not changed. The VIPs are only considered in the Waveform Calculator and a percentage of their area is used to measure gate cost per bin. It is in the outer loop during GR (steps 9 through 13) that "some" of the VIPs are physically placed, and included in the net list, as described below.

A list is maintained of all of the input pins, which are driven by VIPs. This list is utilized at step 9 of the outer loop where their corresponding nets are globally routed, and some of the inverter pairs are physically inserted and sized as part of a logic optimization step. It is at this stage that the net list is changed.

The decision as to whether or not to change the virtual status of a VIP in the outer loop is based on the following two factors: 1) is it likely that we will have to undo this net list change, and 2) is it necessary to place the inverter pair to get an accurate measure of the net routing and topology.

At this initial stage of partitioning (step 4), all wires in adjacent bins are assumed to be separated by the bin-center to bin-center distance, thereby requiring an inverter pair in most cases. But clearly, only a percentage of these wires have lengths greater than or equal to this distance. Therefore, a certain percentage of these wires will not require an inverter pair. However, because these wires will in most cases span only neighboring bins, maintaining the virtual status for these inverter pairs makes them trivial to remove.

There is obviously the potential for multiple far away loads. For distance loads which reside in the same bin, they will share a VIP for the inter-bin connection. For multiple faraway loads in multiple bins, each connection can include a separate VIP for delay calculation purposes, which amounts to a star net topology assumption.

The initial sizes of the inverter pairs are determined initially by the rules chosen for specifying repeater and shielding buffer wire lengths. Then, during waveform calculation, the sizings can be chosen based on simple inverter location and sizing rules following the insertion of inverters in an RC ladder (which is the driver to pin net model primitive).

Using slack information, at step 7 this embodiment iterates with partitioning to decide whether or not to insert an inverter pair for shielding purposes. Some flags can be set in wavecalc to highlight those nets that are prime candidates for shielding buffers.

At step 5, a placement algorithm provides placement of circuit elements based on minimizing a cost function. In this embodiment, the cost function includes congestion, gate area, total wiring, power, and delay components. One example of a suitable placement algorithm is a geometrically bounded placement algorithm (known as the "GBFM" algorithm), which is based upon the Fidduccia-Matheyses algorithm, which is well-known in the art. Under the GBFM algorithm, adjacent quanto-clusters can be exchanged, and a gate within a quanto-cluster can be moved to an adjacent quanto-cluster.

Cofiled and coassigned U.S. patent applications, entitled "Placement Method For Integrated Circuit Design Using Topo-Clustering", Ser. No. 09/096,804. "A Method For Logic Optimization For Improving Timing And Congestion During Placement in Digital Integrated Circuit Design", Ser. No. 09/097,076, "A Method For Accurate And Efficient Updates of Timing Information During Logic Synthesis, Placement And Routing For Digital Integrated Circuit Design", Ser. No. 09/094,542, are hereby incorporated by reference in their entirety.

According to the present invention, inter-bin interconnect wires associated with a gate are concurrently placed when the gate is placed. However, instead of providing exact routing after the gate is placed, the present invention provides a "smear" representation, which represents a collection of optimal possible routes of less than a predetermined cost. One example of such a "smear" representation is a "bounding box" representation, which provides a wiring density over an area covering a number of possible routes of less than the predetermined cost. Cofiled and coassigned U.S patent application, entitled "System and Method for Placement of Gates and Associated Wiring", is hereby incorporated by reference in its entirety.

Because the wiring density is determined without regard to other "wires" (i.e., smeared wires) associated with other gates, the present invention provides a congestion measure that is based on the preferable position of the wire, rather than the constrained maximized route attached to a particular placement of the gate or gates to which the wire is associated. For a given location, the local wiring density, and hence congestion, is the sum of all smears at the location. During placement, a gate and nets associated with the gate can be moved to reduce the local wiring density. A new smear is then calculated for each net at the new gate location. If the net has a large positive slack (i.e., the arrival time is much earlier than the required time), then higher delay routes can be included in the smear. Conversely, where the placement of additional smears increases the congestion at a particular location, the cost estimate (e.g., the slack) on each net related to the smears at the location should be updated. In the present embodiment, an update to a slack is provided after the cost difference exceeds a predetermined threshold.

In the present embodiment, placement and routing are refined through iterations of an inner loop and an outer loop. The inner loop includes steps 5–8, and the outer loop includes steps 5–7 and 9–16 in FIG. 1. After every cycle over the outer loop, the bins of the previous cycle are further partitioned (at step 15, which is discussed below) recursively into smaller bins, with the circuit elements of a bin in a previous cycle being redistributed into the smaller bins in the current cycle. As discussed below, in every cycle through the inner loop, logic optimization techniques (e.g., gate splitting) are applied (at step 7, which is discussed below). Such logic optimization techniques typically modify the input net list with the intention that the resulting net list can be placed and routed at a lower cost. In the present embodiment, if the logic optimization does not result in relief to congestion or result in the gates involved in the optimization being moved, then the logic optimization is reversed (uncloned) at step 6.

In particular, the placement can be based on quadrisection (see, e.g., P. Suaris and G. Kedem, Quadrisection: A New Approach to Standard Cell Layout, In Proc. of ICCAD, November 1987; P. Suaris and G. Kedem, A Quadrisection-Based Combined Place and Route Scheme for Standard Cells, IEEE Trans. on Computer-Aided Design, vol. 8, no. 3, pp. 234–244, March 1989), applied in a recursive manner until all of the partitions are small enough that a final cleanup phase of detailed placement can be applied (at step 17). Overlapping and cycling (see, e.g., D. J-H. Huang and A. B. Kahng, Partitioning-Based Standard Cell Global Placement with an Exact Objective, In Proc. of the International Symposium on Physical Design, April 1997) is necessary during partitioning to avoid local minima and allow gates to migrate across several partitions if necessary. In one embodiment, GBFM can perform geometrically bounded partitioning in place of simple overlapping.

The quadrisection placement minimizes congestion. Bounding box "smear" type congestion measures for the inter-bin wires can be used for the non-critical nets as outlined above. More accurate localized smears based on the optimal net topology can used for the critical nets. It is anticipated that localized smearing will only be necessary for the 2- and 3-pin versions of optimal nets. Nets with 4 or more pins will not easily be smeared, nor is it necessary for them to be smeared based on the objectives of measuring congestion of critical nets. For example, assume that congestion is based on a smear over what will be the eventual routing, without considering the congestion that is already in place there. For multi-pin critical nets, the global router will deviate only slightly, if at all, from the optimal net topology (at step 9).

Modeling, particularly the critical nets, in this way, yields a congestion measure based on where wires "should go", rather than where the wires would have to go if this was the final placement. In contrast to the typical approach to performance driven placement, the approach of this embodiment is toward placing the wires (in a smear sense) and the gates concurrently, then focusing the optimization on lowering the congestion where it is problematic.

The congestion measure also includes the intra-cluster wiring area and congestion. This is approximated via some scheme similar to a bi-section partitioning within the cluster in both horizontal and vertical directions. Minimizing the number of inter-bin wires can be insufficient, if the objective is to synthesize and place the design so that congestion is minimized everywhere, including inside of partitions. Moreover, for a wiring bound design, the bin areas will be constrained by the total wiring contained within them, along with the gate areas.

The overall cost is a function of, for example, congestion, gate area, total wiring, power, and delay. Because the delays and wiring area are calculated based on the net topology that reflects where the wires would go for a good delay, the cost function can include scaling of the congestions by the slacks. For example, if the local congestion measure is determined based on where the wire wants to go for a good delay, but there is significant positive slack, then this congestion estimate is smeared out further to reflect that routing this net in a sub-optimal performance manner will not impact the overall design optimality.

Performance prediction is based on a waveform calculation for the preferred (from a delay perspective) set of net topologies (routings). The localized wiring areas are based on the same set of net topologies. The waveform calculations also consider wire-sizing assignments based (in part) on net lengths, because making decisions regarding delays and VIP insertion is otherwise erroneous. For this reason the congestion measures may have to consider wiring congestion per wire width (layer), but in the least must consider the increased wiring area associated with wider wires. Because layer assignment, hence wire size, depends on routing distance, GR during the early stages of partitioning will give a clear indication of the potential congestion problems for the global wires on the upper layers of routing.

Tuning of the congestion smearing can be required during execution. Steps 9–12 represent a global route (GR) at the completion of each level of partitioning and act as a check on the timing/congestion predictions. It is also at this stage of global routing that the impact of coupling as it impacts the delays and signal integrity is considered. If some really congested areas and timing violations are identified following the GR check, the problematic bins are scaled accordingly and the optimization loop is re-entered (at steps 12–13). The next level of quadrisection is proceeded to only when GR is feasible at each level of partitioning.

The good-performance net topology can be constructed such that it passes directly through an area that is completely blocked by a megacell or dense clock/bus wiring. If the net has a lot of positive slack, then it can be smeared such that it can remain there. But if the net is critical, then the cost function will place a very high cost on this placement such that it will be moved elsewhere. In this way, blockages can be naturally handled using the net smear model.

During waveform calculation, inverter pairs are virtually inserted for those pins that are marked as likely candidates for such insertion. This marking occurs either: 1) for all interbin wires for k-level of partitioning, or 2) in box 7 as part of electrical optimization to alleviate congestion/timing constraints. A list is maintained of all of the pins which are candidates for VIPs, and wavecal creates a list of all pins for which VIPs were assumed in the delay calculations. Markings for potential locations of VIPs are identified as either: 1) delay/attenuation repeaters, or 2) shielding buffers. For case 1), wavecalc inserts the VIPs when the attenuation limits require it, or when the delay is improved over the unbuffered case, or both. For case 2), the shielding VIPs are inserted as long as the delays to the near-driver loads are improved, which is simply based on whether or not the total load on the original driver is improved by the addition of this shielding buffer (which depends on the locations and possible placement moves for the far away loads).

More complex logic optimization steps, can also be desirable to relieve congestion, but they are not attempted within the waveform calculator, because they rely on global slack information. Instead, once a level of partitioning completes, some logic optimization is performed at step 7 in terms of the approximate net topology models. An example of an LO move to relieve congestion is gate splitting. The net list is changed to split the gate, then the loop returns to GBFM to see if the partitioning moves can take advantage of the net list change to improve congestion. If GBFM moves the split gates, then the change is made permanent. If congestion is not changed by the splitting, the LO move is uncloned in the subsequent step 6.

Importantly, with regard to all inverter pair insertions and logic optimizations, the area of the partition is determined by the gates and associated routing that lies in that partition. Therefore, the global convergence is not altered by any logic optimizations, which: 1) remains within the area constraints of all partitions, and 2) maintains the timing constraints within and across a partition in terms of the statistical delay models. Moreover, if as expected, the partition sizes are dictated by congestion, then more gates can be added during the logic optimization. However, it is important to note that for this reason the logic optimization should also consider (smeared) congestion as part of its cost function. As the partitions become smaller and the placement changes become more localized, there will be less opportunity to change the logic within a partition due to congestion and timing constraints. However, the need for logic changes will likely decrease as the partitions become smaller and the design begins to converge.

The waveform calculations are used to update the delay edges on the slack graph, however, the slacks are not updated with each delay edge change. Instead, a lazy update scheme is used so that GBFM is not overly burdened by the time cost function, and so that a parallel processing strategy can be more readily applied. During GBFM, however, the delay changes may reach the threshold point which forces an update of the slack graph. Prior to exiting step 5, a slack graph update is performed prior to beginning the logic optimization steps.

At step 7, logic optimizations, such as gate sizing, pin assignment, gate splitting, cloning, buffer insertion, sizing, and replication, are performed on the net list. Cofiled and coassigned U.S. patent application, entitled "System and Method for Concurrent Buffer Insertion and Placement of Logic Gates", Ser. No. 09/096,810, is hereby incorporated by reference in its entirety.

At step 8, if the previous logic optimization step results in a change to the net list, then another iteration of GBFM is carried out. Otherwise, a performance-driven global router is called at step 9 to verify that the smeared wiring can result in actual routes meeting timing estimates, to provide actual routing for signal paths involving long wires, to actualize some VIPs into buffers included in the net list and to remove some VIPs.

In steps 1 through 8, congestion is minimized based on predictable-interconnect models which represented the best-performance wiring placements. If the delay predictions were reasonably accurate, and congestion was properly minimized, global routing should easily complete. These estimates included that congestion was scaled by slack in the cost function to "roughly" reflect areas where the global router may have to exploit positive slack.

Due to the uncertainty of these congestion estimates, however, an actual global routing is performed as a sanity check. Only those nets for which global routing within the predictable routing smear was not possible should cause timing violations to appear at step 10. These timing violations will be used to identify those bins which are overly congested and require more routing capacity than was anticipated. These bin capacities are scaled (at step 12), and the inner most loop optimizations are repeated (at step 13) at the same level of partitioning.

For those nets that are marked and include the insertion of shielding buffers, smart topology selection is performed so that the net is designed to accept the required post-routing shielding buffer insertion. For example, a Steiner tree may be optimal from a wiring standpoint, but something closer to a star topology may be required when certain pins are being separated for shielding purposes.

To actually insert inverter pairs into the net list and locate them in bins would be crudely specifying a global routing for long and complex nets. Therefore, this GR/LO step places virtual repeaters only when the net is so long, or so complex, that not doing so would result in too much timing and congestion ambiguity.

For example, VIPs between adjacent bins do not have to be placed in the net list. Moreover, as the partitioning continues, a large portion of these nets will become shorter such that the VIPs are removed. Conversely, long nets that span several bins will be inserted in the net list, and physically sized and inserted in the proper bins as part of logic optimization in this box. Upon completion of a GR for the net, a dynamic programming algorithm based on (see, e.g., L.P.P.P. van Ginneken, Buffer Placement in Distributed RC-Tree Networks for Minimal Elmore Delay, ISCAS 1990), but using a more accurate delay model, is used to size and locate the inverters along the net.

A majority of VIP connections that span multiple bins will likely not become short enough to warrant VIP removal. Therefore, changing the net list and removing their virtual nature should not be a problem. Additionally, inserting these inverter pairs in the net list will allow the design to properly evolve. As the partitioning continues to lower levels, more of the inserted inverters will be placed, and the global routings will begin to solidify.

At step 10, the delays and slack graphs of the net list are recomputed in substantially the same manner as described above with respect to step 4, except that the global routes are used to specify actual nets, and wavecalc or is used to calculate the delays of these nets. Also in contrast to step 4, min and max delays are calculated, because approximate timing windows are used for coupling assessment.

At step 11, "coupling assessment" is performed. Coupling assessment in the present embodiment is carried out by identifying interconnect portions (e.g., buses) that have similar temporal activities and travel significant distances along each other, and adjusting the delays using a model that captures the cross-coupling between these interconnect portions.

Based on some notion of what wires travel long distances in the same space as other wires, and the corresponding temporal activity from step 10, the nets for which coupling may have a significant impact on timing are identified. This is an approximate assessment. The min/max switching window from timing analysis is not a bounding window, because coupling has not been considered. Moreover, the switching information in the slack graph is stored only for gate input pins. With gate delay information, gate output pin delays are also available, but timing windows at interconnect intermediate nodes are not saved. Based on the delay model uncertainty, more accurate coupling information may not be warranted at this stage and may only be required during detailed routing.

The interconnect intermediate node information can be easily added by inserting checkpoint nodes along long interconnect segments and storing them as part of the timing graph. The min/max absolute bounds would require us to make nominal delay approximations and worst case approximations (by scaling all of the coupling C's by a factor of 2–3, for example) during every waveform calculation.

Based on the wires that have similar temporal activity and travel significant distances together, the congestions in these bins is reduced so that the router will have more options to meet timing constraints, which includes the ability to space wires if necessary.

Congestion reduction is accomplished by the bin scaling at step 12, and the return to the optimization loop at step 13. If timing constraints are unchanged by coupling, for example, if the corresponding nets are non-critical, then the corresponding bin areas are not scaled.

Coupling assessment at the early stages of partitioning is critical, because it is the long wires that travel together that are the most problematic (e.g. buses). A coupling distance factor can be generated based on technology information. As the number of inter-bin wires increases toward the lower levels of partitioning, couplings to neighboring wires become a smaller percentage of the total net wiring, and therefore, coupling-assessment is less critical.

At step 12, "bin scaling" is performed. Bin scaling identifies interconnect portions for which timing violations are detected at step 9 or excessive coupling is detected at step 11. Bin scaling adjusts congestion (e.g., wiring density) in the nets in which the timing violations occur, so that, in the next cycle of the inner loop, the GBFM algorithm (at step 5, which is discussed above) can operate on these nets first, guided by their adjusted congestion measures. In particular, timing violations on nets due to unanticipated congestion that is uncovered during GR, or coupling that is discovered at step 11 are identified, along with the bins in which they reside. In order to return to the inner most loop to correct these problems, these timing constraint violations are translated into new bin area capacities. The bins in which the violating nets appear are scaled down in capacity, thereby penalizing their congestion measure. Then, upon re-entering the inner-most loop, these congestion violations represent the initial primary targets.

At step 13, if significant bin scaling was performed at step 12, then additional iterations over the inner loop (from step 5) can be carried out to further provide placement and routing at the current level of partition.

At step 14, if the current quanto-cluster size is larger than a predetermined size (e.g., the gate/cell is a lower bound on the partition size), then at step 15, each current bin partition is partitioned into four equal bins (e.g., using a random processing into four quadrants). Circuit elements of the current bins are randomly remapped into the new bins. Updates to delay and slack graphs are then carried out at step 16, in substantially the same manner as discussed above with respect to steps 4 and 10. The inner loop is then reentered at step 5, as discussed above.

Otherwise, (i.e., the current quanto-cluster is less than the predetermined value) no further partitioning takes place. Instead, at step 17, a detailed placement algorithm, such as conventional cool-annealing cycles, is used to provide final placement of circuit elements of each quanto-cluster. At step 18, a global router is invoked to perform final routing (e.g., detailed routing with coupling noise avoidance).

Although particular embodiments of the present invention have been shown and described, it will be obvious to those skilled in the art that changes and modifications can be made without departing from the present invention in its broader aspects. For example, the present invention is applicable not only to the design of logic circuits with conventional signaling using conventional interconnects, but is also applicable to the design of other circuit technologies, such as high speed mixed mode signals on RF transmission lines or circuits using copper interconnect. The present invention is also applicable to integrated systems design such as the design of a micromachine that includes electronic circuitry. Accordingly, the appended claims are to encompass within their scope all such changes and modifications that fall within the true scope of the present invention.

What is claimed is:

1. A method for design optimization using logical and physical information, comprising:

receiving a behavioral description of an integrated circuit;

synthesizing, from said behavioral description, circuit elements of said integrated circuit; and concurrently optimizing placement and logic of said circuit elements in accordance with a cost function.

2. The method of claim 1, wherein said concurrently optimizing further comprising:

optimizing routing in accordance with said cost function.

3. The method of claim 1, wherein logic of said circuit elements is optimized using techniques including one or more of gate sizing, pin assignment, logic replication, cloning, and buffering.

4. The method of claim 1, wherein said cost function takes into account delays and slacks between circuit elements.

5. The method of claim 1, wherein said concurrently optimizing introduces virtual buffers between circuit elements.

6. The method of claim 1, wherein said cost function takes into account wire density between circuit elements.

7. A method for design optimization using logical and physical information, comprising:

receiving a behavioral description of an integrated circuit;

synthesizing, from said behavioral description, circuit elements of said integrated circuit; and concurrently optimizing placement and logic of said circuit elements in accordance with a cost function, said concurrently optimizing comprising:

executing an inner loop, the inner loop comprising optimizing placement of the circuit elements, reversing any logic changes that did not result in a change in the placement of the circuit elements, and optimizing logic of the circuit elements; and executing an outer loop, the outer loop comprising executing a performance driven global router.

8. The method of claim 7, further comprising:

executing a final placement of the circuit elements; and executing a global router to perform a final routing.

9. The method of claim 7 further comprising:

clustering said circuit elements into topological clusters; and partitioning an area corresponding to a semiconductor substrate of the integrated circuit based on the topological clusters.

10. The method of claim 7, further comprising:

repeating the inner loop if the optimizing logic changes the circuit elements; and repeating the outer loop if the optimizing placement changes the placement of the circuit elements.

* * * * *